United States Patent
Kimura et al.

(10) Patent No.: US 10,595,038 B2
(45) Date of Patent: Mar. 17, 2020

(54) MOVING IMAGE CODING APPARATUS, MOVING IMAGE CODING METHOD AND RECORDING MEDIUM

(71) Applicant: CANON KABUSHIKI KAISHA, Tokyo (JP)

(72) Inventors: Makoto Kimura, Tokyo (JP); Reiko Fujino, Kawasaki (JP); Satoshi Naito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/973,138

(22) Filed: May 7, 2018

(65) Prior Publication Data

US 2018/0332299 A1 Nov. 15, 2018

(30) Foreign Application Priority Data

May 11, 2017 (JP) ................................ 2017-094784

(51) Int. Cl.
*H04N 19/52* (2014.01)
*H04N 19/159* (2014.01)
*H04N 19/176* (2014.01)
*H04N 19/14* (2014.01)
*H04N 19/119* (2014.01)
*H04N 19/107* (2014.01)
*H04N 19/139* (2014.01)

(52) U.S. Cl.
CPC ........... *H04N 19/52* (2014.11); *H04N 19/107* (2014.11); *H04N 19/119* (2014.11); *H04N 19/139* (2014.11); *H04N 19/14* (2014.11); *H04N 19/159* (2014.11); *H04N 19/176* (2014.11)

(58) Field of Classification Search
CPC .... H04N 19/52; H04N 19/139; H04N 19/107; H04N 19/119; H04N 19/14; H04N 19/176; H04N 19/159
USPC ...................................................... 375/240.16
See application file for complete search history.

(56) References Cited

U.S. PATENT DOCUMENTS

| | | | | |
|---|---|---|---|---|
| 2013/0094581 | A1* | 4/2013 | Tanizawa | H04N 19/159 375/240.12 |
| 2014/0010309 | A1* | 1/2014 | Shiodera | H04N 19/51 375/240.16 |
| 2017/0324973 | A1* | 11/2017 | Tanner | H04N 19/176 |

FOREIGN PATENT DOCUMENTS

JP 2007-184846 A 7/2007

* cited by examiner

*Primary Examiner* — Marnie A Matt
(74) *Attorney, Agent, or Firm* — Canon U.S.A., Inc. IP Division

(57) ABSTRACT

A moving image coding apparatus includes a feature amount derivation unit configured to derive a feature amount of a block having a reference size smaller than the block unit, the block included in a subject frame being a processing subject of the frames included in the moving image, a decision unit configured to, in a case where the feature amount, derived by the feature amount derivation unit, of the block having the reference size is matched with a first condition, decide the reference size as a block size for inter-prediction and decide a size equal to or smaller than the block size for inter-prediction as a block size for intra-prediction, and a selection unit configured to perform a predetermined evaluation and select one of inter-prediction and intra-prediction as a prediction method for the block having the block size decided by the decision unit.

18 Claims, 18 Drawing Sheets

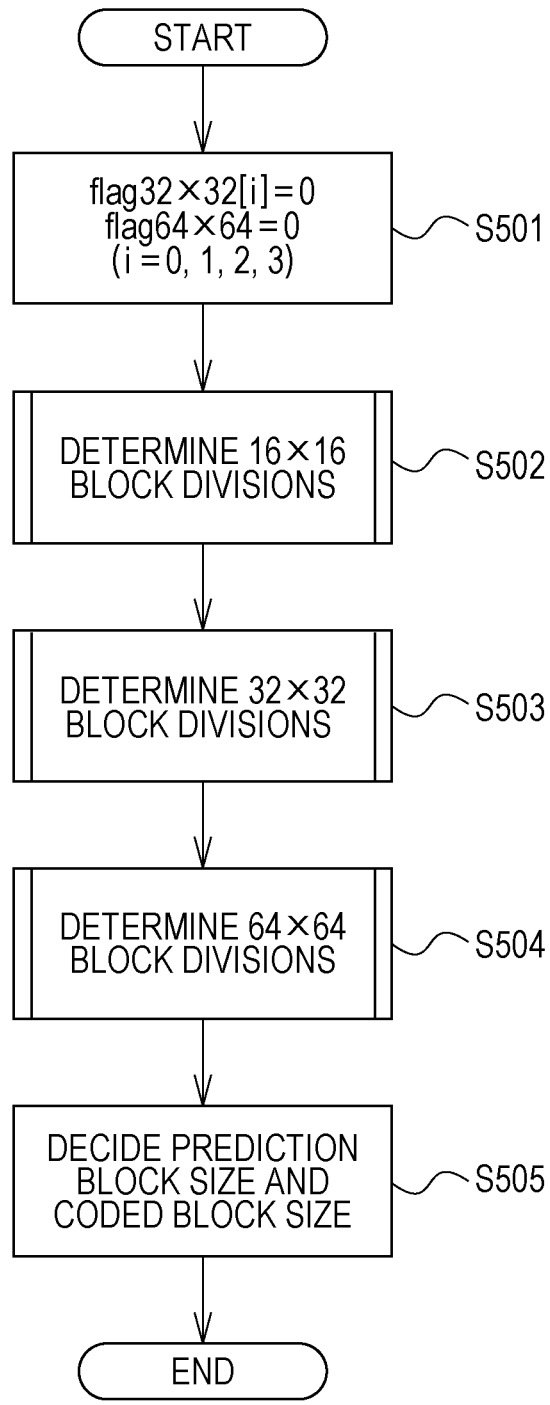

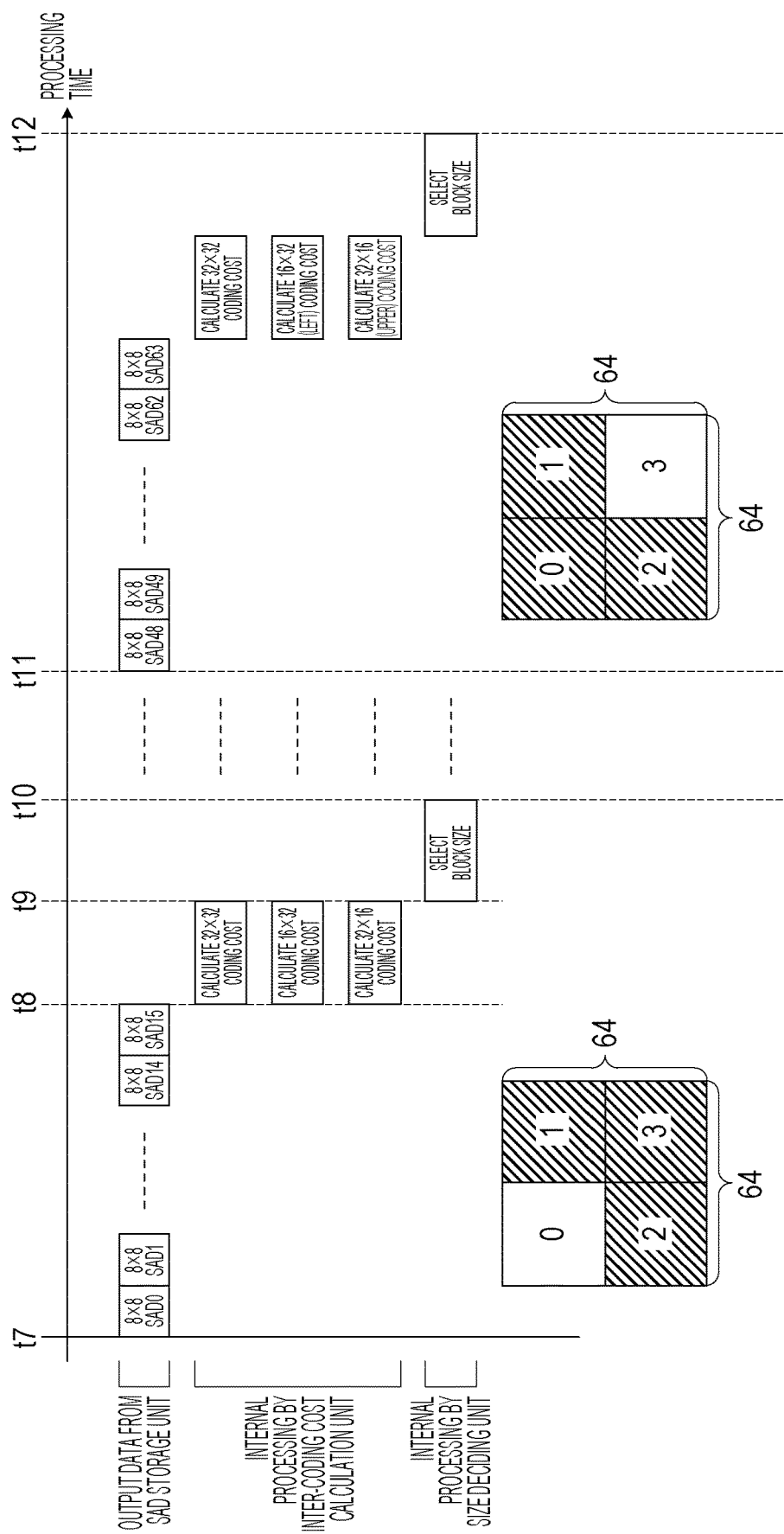

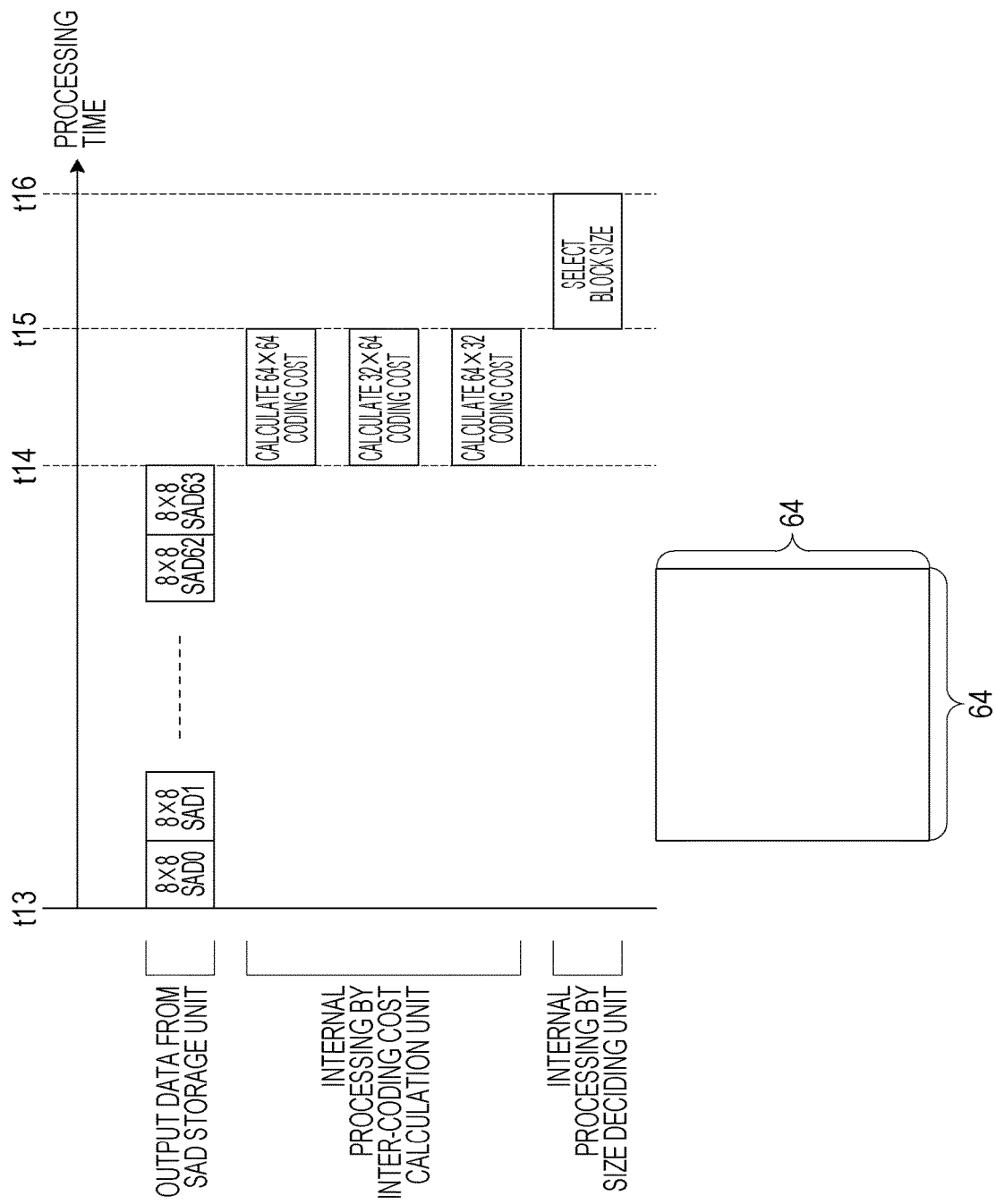

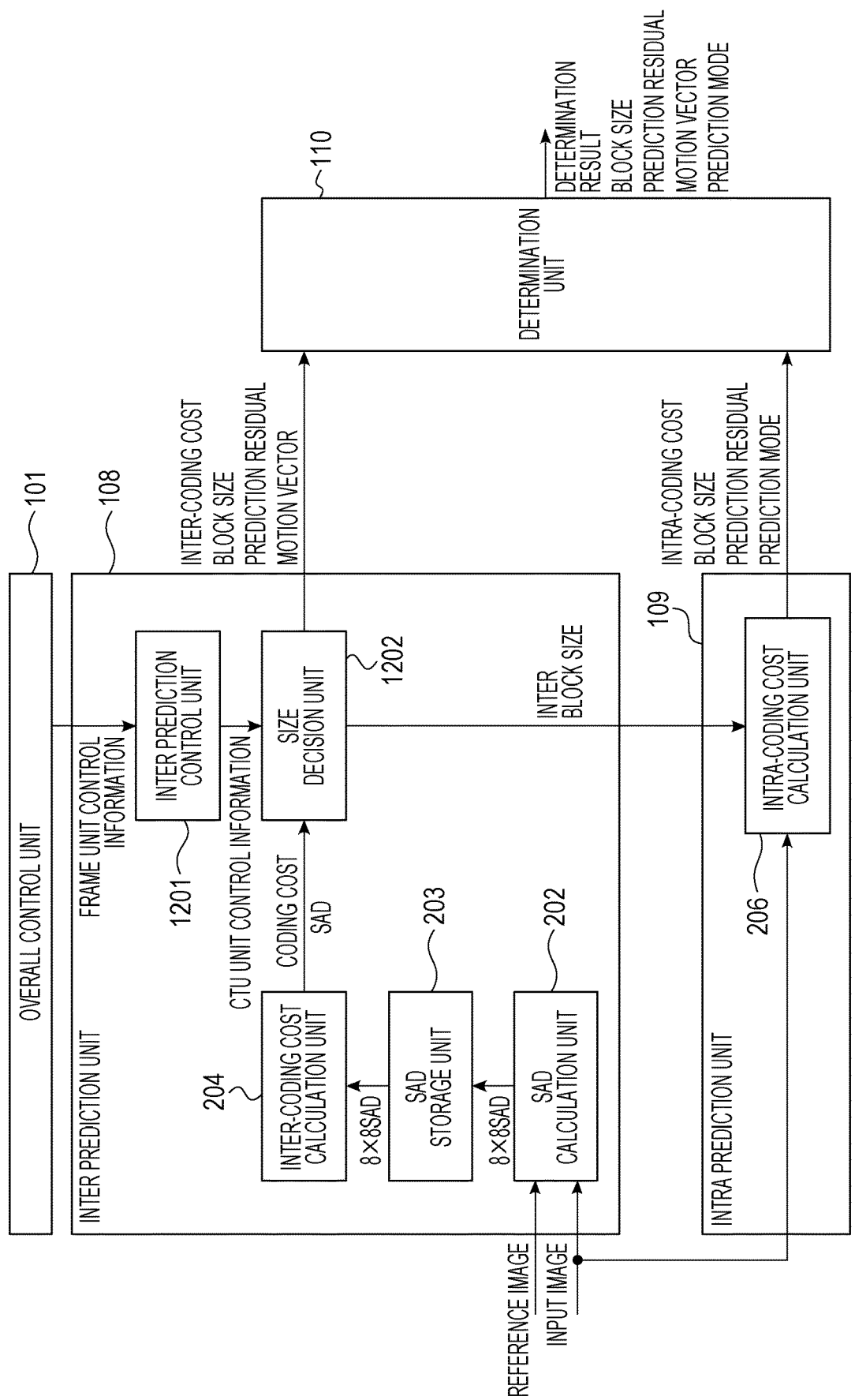

MOVING IMAGE CODING APPARATUS, MOVING IMAGE CODING METHOD AND RECORDING MEDIUM

BACKGROUND OF THE INVENTION

Field of the Invention

The present disclosure relates to a moving image coding apparatus, a moving image coding method, and a recording medium.

Description of the Related Art

In the past, H.264 and HEVC (High Efficiency Video Coding) are provided as international standards for moving image coding methods. According to these technologies for moving image coding, images (frames) included in a moving image are divided into blocks each having a predetermined size and undergo coding processing in blocks.

According to H.264, images are divided into blocks each called an MB (Macro Block), and either inter-prediction or intra-prediction can be selected for each of the MBs. According to HEVC, on the other hand, images are divided into maximum coding blocks each called a CTU (Coding Tree Unit), and the CTUs are further hierarchically divided into coding blocks each called a CU (Coding Unit). The block size of each CTU may be selected from 64×64, 32×32, and 16×16 blocks. CUs having sizes of 64×64, 32×32, 16×16, and 8×8 blocks may be selected arbitrarily in combination within a CTU. Thus, according to HEVC, more various block divisions can be applied compared with conventional H.264, for example, and finer units (CU unit) may be selected for inter-prediction and intra-prediction.

In order to decide an appropriate block division and prediction scheme according to HEVC, coding costs for intra-prediction and inter-prediction to be performed on a plurality of possible block sizes may be required to be calculated, which may disadvantageously result in an increased calculation amount. On the other hand, Japanese Patent Laid-Open No. 2007-184846 discloses a technology which limits a block size for which the coding cost is to be calculated by intra-prediction based on a block size decided by inter-prediction. This can reduce the amount of calculation of a coding cost for intra-prediction required for intra/inter determination.

However, intra-prediction applying a larger block size is generally more efficient for a flat area having less varied pixel values in an intra-frame. On the other hand, intra-prediction applying a smaller block size can be more efficient for an area having more varied pixel values. On the other hand, performing inter-prediction with a larger block size on an inter-frame having a region having more varied pixel values may sometimes be efficient if a similar region thereto is found through a motion search because it results in a small prediction residual. The block sizes suitable for inter- and intra-predictions (with higher coding efficiency) may vary in accordance with characteristics of given images. This means that coding using intra-prediction with a smaller block size may sometimes be more efficient though coding with a larger block size is efficient from an inter-prediction viewpoint.

On the other hand, according to the technology disclosed in Japanese Patent Laid-Open No. 2007-184846, when a large block size is selected by inter-prediction, intra-prediction with a small block size is not selected. This may not improve the coding efficiency as a result.

SUMMARY OF THE INVENTION

In order to prevent an increase of a calculation amount and to improve coding efficiency in moving image coding, the following configuration may be provided, for example. According to an aspect of the present disclosure, a moving image coding apparatus dividing frames included in a moving image into predetermined block units and selectively performing inter-prediction coding or intra-prediction coding thereon includes a feature amount derivation unit configured to derive a feature amount of a block having a reference size smaller than the block unit, the block included in a subject frame being a processing subject of the frames included in the moving image, a decision unit configured to, in a case where the feature amount, derived by the feature amount derivation unit, of the block having the reference size is matched with a first condition, decide the reference size as a block size for inter-prediction and decide a size equal to or smaller than the block size for inter-prediction as a block size for intra-prediction, and a selection unit configured to perform a predetermined evaluation and select one of inter-prediction and intra-prediction as a prediction method for the block having the block size decided by the decision unit.

Further features of the present invention will become apparent from the following description of exemplary embodiments with reference to the attached drawings.

BRIEF DESCRIPTION OF THE DRAWINGS

FIG. 5 is a flowchart illustrating size decision processing.

FIG. 11B is a timing chart illustrating division determination processing.

FIG. 11C is a timing chart illustrating division determination processing.

FIG. 12 illustrates a functional configuration of a prediction processing unit according to a second embodiment.

DESCRIPTION OF THE EMBODIMENTS

With reference to drawings embodiments of the present disclosure will be described below.

First Embodiment

Figure 1:
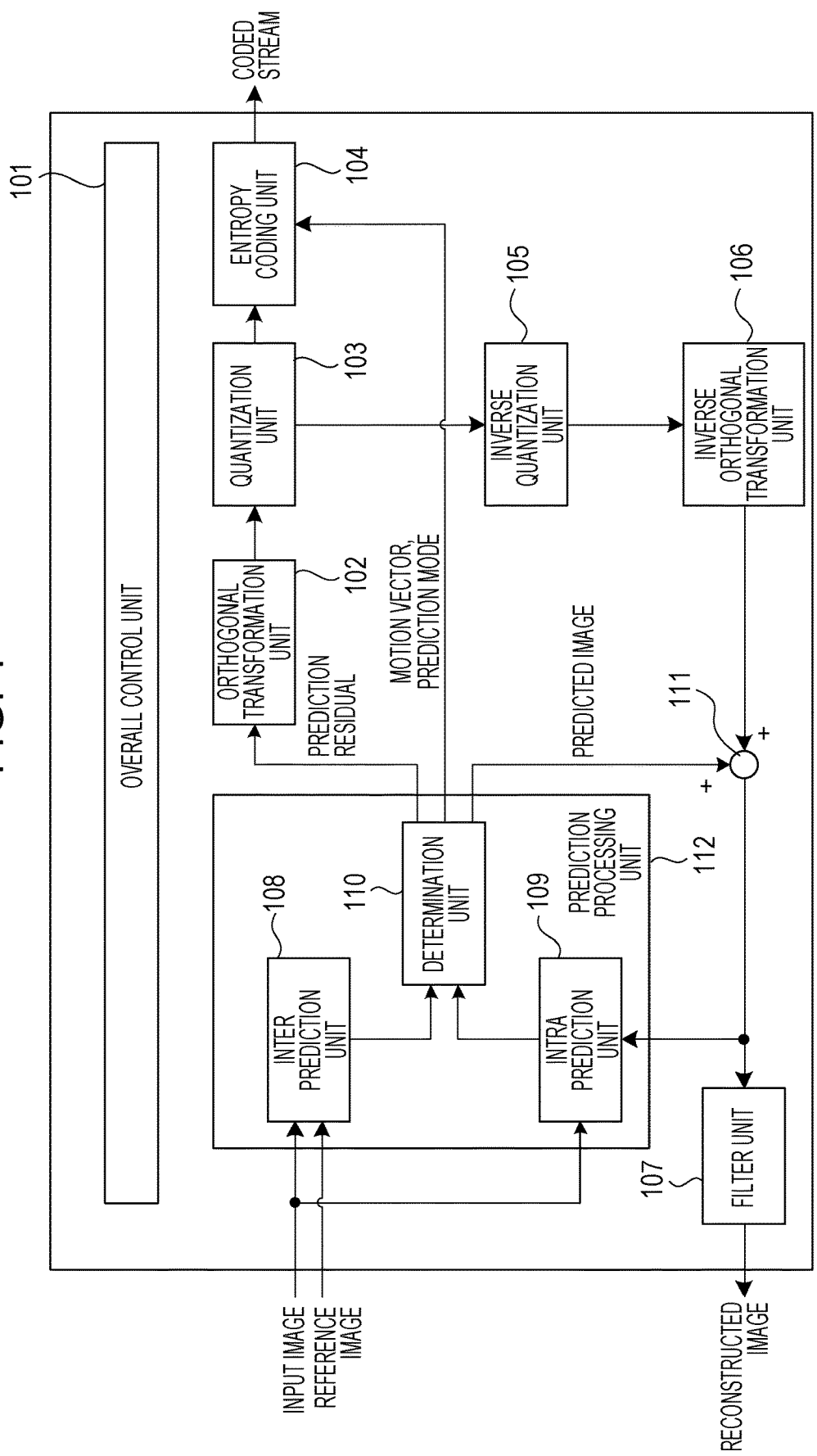
FIG. 1 illustrates a moving image coding apparatus.

FIG. 1 illustrates a moving image coding apparatus according to a first embodiment. The moving image coding apparatus according to this embodiment is configured to divide frames included in a moving image into predetermined blocks and to selectively perform inter-prediction coding or intra-prediction coding in blocks. The moving image coding apparatus 100 includes an overall control unit 101, an orthogonal transformation unit 102, a quantization unit 103, and an entropy coding unit 104. The moving image coding apparatus 100 further includes an inverse quantization unit 105, an inverse orthogonal transformation unit 106, a filter unit 107, an inter-prediction unit 108, an intra-prediction unit 109, a determination unit 110, and an adder 111.

An image (input frame) input to the moving image coding apparatus 100 may be input to the inter-prediction unit 108 and the intra-prediction unit 109. The inter-prediction unit 108 may perform an inter-prediction process on the input image by using a reference image (reference frame) and output a result of the prediction (such as a prediction residual, motion vector information, a block size, and a coding cost) to the determination unit 110. The intra-prediction unit 109 may perform an intra-prediction process on the input image (input frame) and outputs a result of the prediction (such as a prediction residual, a prediction mode, a block size, and a coding cost) to the determination unit 110.

The determination unit 110 may compare the coding cost provided by the inter-prediction and the coding cost provided by the intra-prediction and may select one providing a lower coding cost of the prediction methods. The determination unit 110 may output the information regarding the prediction residual and block size provided by the selected prediction method to the orthogonal transformation unit 102. The determination unit 110 may select one of inter-prediction and intra-prediction based on a predetermined evaluation, and it is noted that a specific process therefor is not limited to embodiments described herein. If the inter-prediction is selected, the determination unit 110 may further output the motion vector information to the entropy coding unit 104 and output the inter-predictive image to the adder 111. If the intra-prediction is selected, the determination unit 110 may output prediction mode information to the entropy coding unit 104 and output intra-predictive image to the adder 111. The orthogonal transformation unit 102 may perform an orthogonal transformation on the prediction residual and output a transformation coefficient to the quantization unit 103.

The quantization unit 103 may quantize the transformation coefficient and output quantized transformation coefficient to the entropy coding unit 104. The entropy coding unit 104 may code the prediction mode, motion vector, and the quantized transformation coefficient and output them as a coded stream. The quantized transformation coefficient may further undergo inverse quantization in the inverse quantization unit 105 and inverse orthogonal transformation in the inverse orthogonal transformation unit 106 so that it can be reconstructed as a prediction residual. The reconstructed prediction residual may be input to the adder 111. The adder 111 may add the reconstructed prediction residual and the predictive image from the prediction processing unit 112 to generate a reconstructed image and output it to the filter unit 107 and the intra-prediction unit 109. The filter unit 107 may perform a filtering process on the reconstructed image from the adder 111, output a reconstructed image to be used for inter-prediction and store it in a storage unit, not illustrated. These units are controlled based on control signals (not illustrated) from the overall control unit 101.

Figure 2:
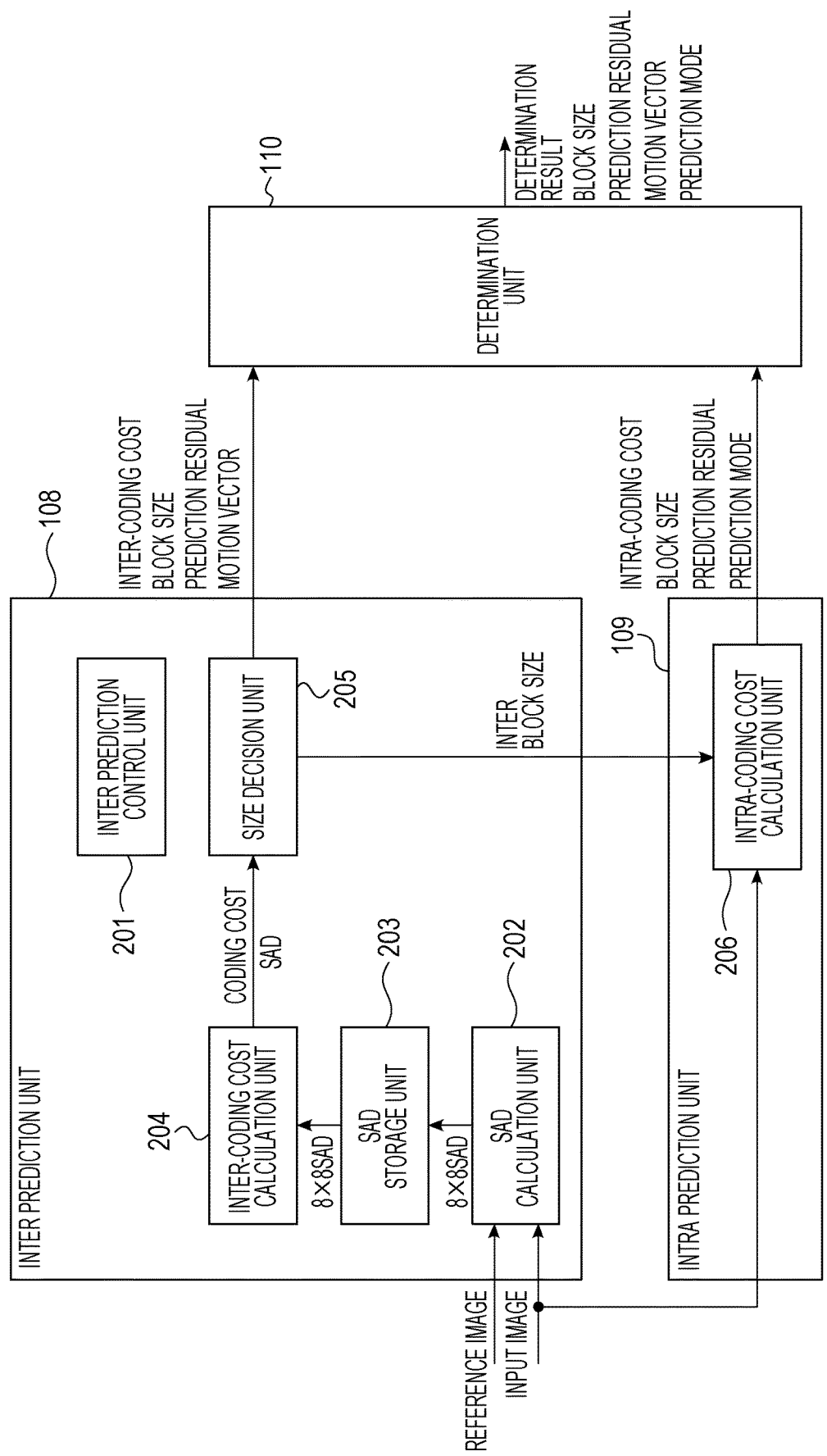
FIG. 2 is a functional configuration diagram illustrating a prediction processing unit.

FIG. 2 illustrates a functional configuration of the prediction processing unit 112. With reference to FIG. 2, basic operations to be performed by the prediction processing unit 112 will be described. According to this embodiment, 64×64 CTUs based on HEVC are applied. In other words, 64×64 CTUs are example predetermined block units. The inter-prediction unit 108 has an inter-prediction control unit 201, a SAD (Sum of Absolute Difference) calculation unit 202, a SAD storage unit 203, an inter-coding cost calculation unit 204, and a size decision unit 205. The intra-prediction unit 109 includes intra-coding cost calculation unit 206. A SAD refers to a sum of absolute values of difference values of pixels between a block to be coded and a block having the same shape within a reference image. The expression "8×8 SAD" refers to a sum of absolute values of inter-pixel differences between an 8×8 block to be coded and an 8×8 block within a reference image. The SAD may be calculated by performing a motion search by the SAD calculation unit 202.

Figure 3:
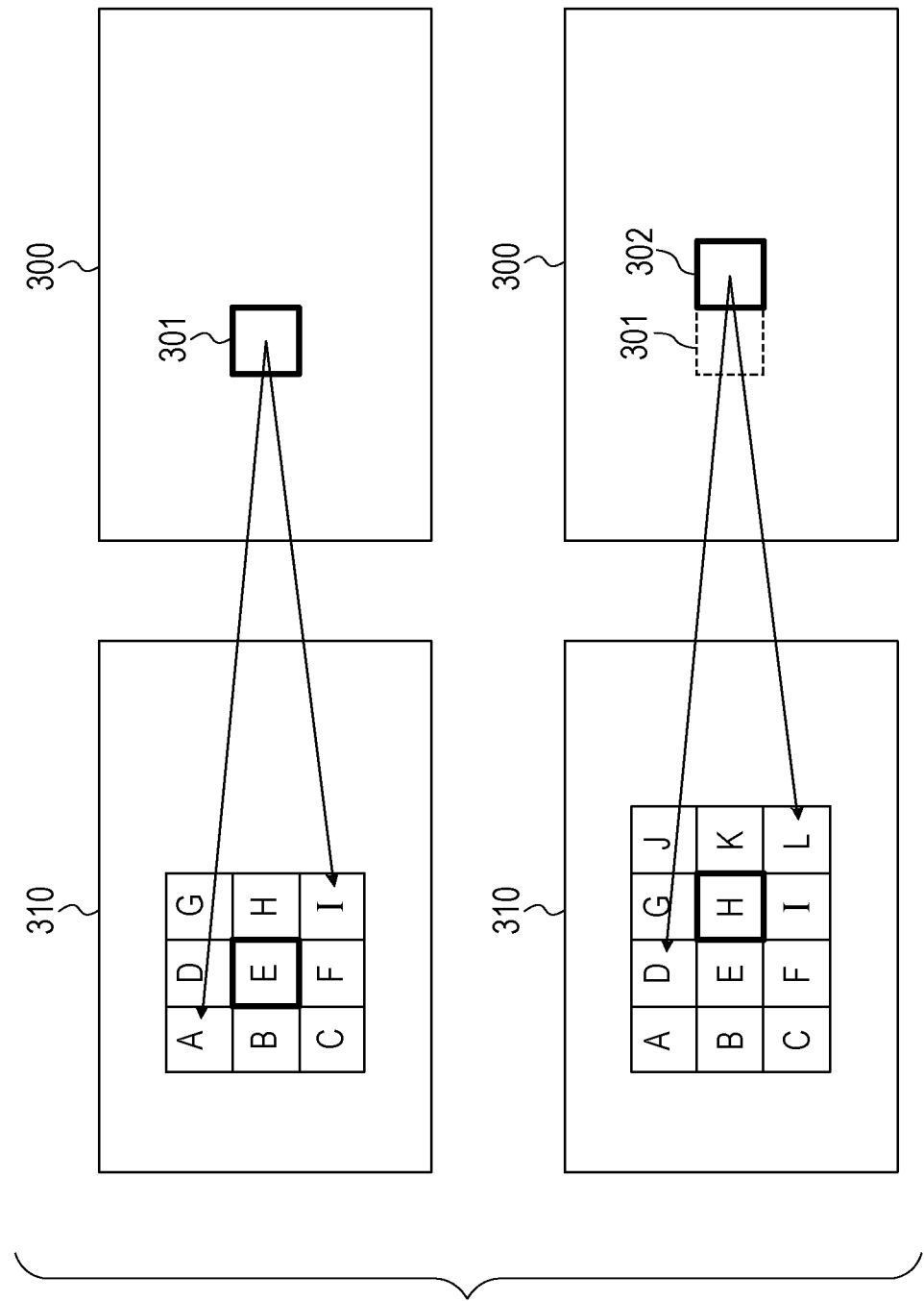
FIG. 3 illustrates an 8×8 SAD example.

The SAD calculation unit 202 may perform a motion search on each 8×8 block in an image to be coded and calculate a SAD (8×8 SAD) from a plurality of 8×8 regions in the reference image. FIG. 3 illustrates an 8×8 SAD example calculated in the SAD calculation unit 202. As illustrated in FIG. 3, the SAD calculation unit 202 calculates SADs between blocks from 8×8 block A to an 8×8 block I included in the reference image 310 and an 8×8 block 301 included in the image to be coded (64×64 CTU) 300. The SAD calculation unit 202 may further calculate SADs between blocks from 8×8 block D to an 8×8 block L included in the reference image 310 and an 8×8 block 302. Referring to FIG. 3, 8×8 blocks E, H indicated by thick lines within the reference image 310 represent blocks corresponding to the identical positions to those of the 8×8 blocks 301 and 302 within the image to be coded 300. According to this embodiment, the SAD calculation unit 202 calculates nine 8×8 SADs and records the 8×8 SADs in the SAD storage unit 203.

It should be noted that the number of blocks (or the number of points) to be calculated is not limited to the one according to this embodiment. The SAD calculation unit 202 may perform a motion search on an arbitrary N point (N: an integer equal to or higher than 1) and output the 8×8 SADs to the SAD storage unit 203. The 8×8 block is an example block having a reference size. The reference size is a predetermined size smaller than that of a block unit and is not limited to the one according to any of embodiments. The SAD is an example feature amount of a block and an example index value relating to a difference between a frame to be processed and a reference frame. The SAD calculation unit 202 may perform a process that is an example of a feature amount derivation process for deriving a feature amount of a block having a reference size.

Referring back to FIG. 2, the SAD storage unit 203 holds a plurality of 8×8 SADs calculated in the SAD calculation unit 202 and outputs them in response to a request from the inter-coding cost calculation unit 204. The inter-coding cost calculation unit 204 uses the amounts of code of the motion vectors corresponding to the 8×8 SADs held in the SAD storage unit 203 to calculate a coding cost for each block size. The coding cost is calculated based on a result of multiplication of estimated amount of code for motion vector and weighing coefficient and a result of addition of SADs, without limiting thereto. According to this embodiment, the inter-coding cost calculation unit 204 calculates coding costs in order from a small reference block size (8×8) to a largest block size (64×64). However, embodiments of the present disclosure are not limited thereto. The inter-coding cost calculation unit 204 may use 8×8 SADs to calculate a SAD for a larger size.

Figure 4:
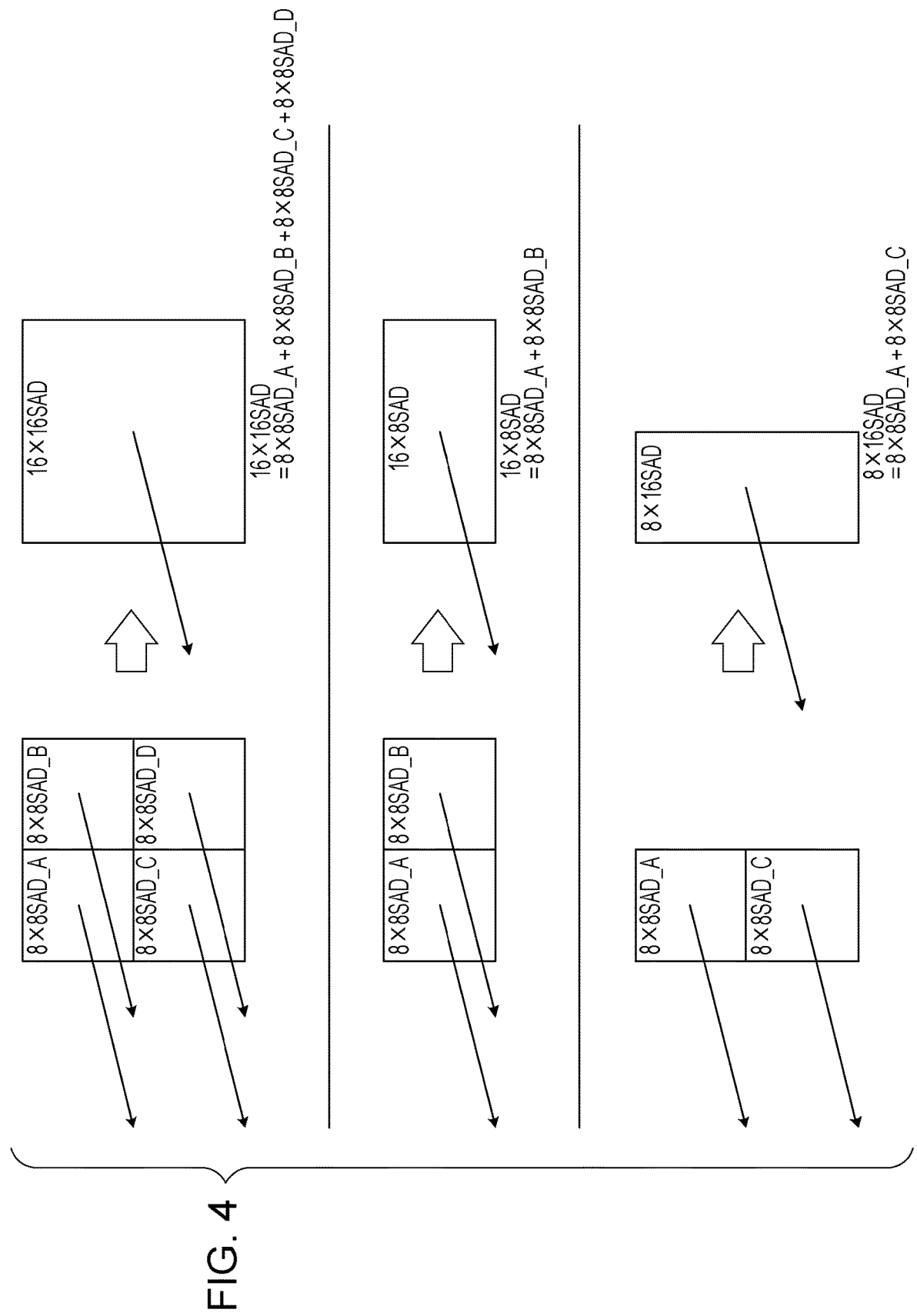
FIG. 4 is an explanatory diagram illustrating SAD calculation processing.

FIG. 4 is an explanatory diagram illustrating SAD calculation processing. Referring to FIG. 4, the inter-coding cost calculation unit 204 adds SADs (8×8 SAD_A to 8×8 SAD_D) of four 8×8 blocks having an equal motion vector to calculate a 16×16 SAD. The inter-coding cost calculation unit 204 adds SAD (8×8 SAD_A and 8×8 SAD_B) of two 8×8 blocks having an equal motion vector to calculate an 8×16 SAD. The inter-coding cost calculation unit 204 adds SAD (8×8 SAD_A and 8×8 SAD_C) of two 8×8 blocks having an equal motion vector to calculate a 16×8 SAD.

The inter-coding cost calculation unit 204 add the SADs (SAD1) of a plurality of 8×8 blocks having an equal motion vector to calculate a SAD (SAD2) of a larger 8m×8n block (where m and n are integers equal to or higher than 1). In other words, the inter-coding cost calculation unit 204 calculates N search results (SADs) for the 8m×8n block by using N motion search results (8×8 SAD) held in the SAD storage unit 203. Thus, the moving image coding apparatus 100 does not execute motion searches on blocks excluding 8×8 blocks. Therefore, the calculation amount can be reduced for that. This processing calculates a feature amount (SAD) of a block to be derived based on the feature amount (SAD) of the reference size block (8×8 block) and is an example of the feature amount derivation process.

The inter-coding cost calculation unit 204 calculates N coding costs for each block size by using the calculated SADs and the corresponding motion vector coding amount. The inter-coding cost calculation unit 204 then outputs a minimum coding cost and information including the corresponding motion vectors and SADs for each block size to the size decision unit 205. The size decision unit 205 decides a block size (block division method) including 64×64 CTUs by using the minimum coding cost and the corresponding motion vector and SAD information for each block size output from the inter-coding cost calculation unit 204.

Figure 6A:
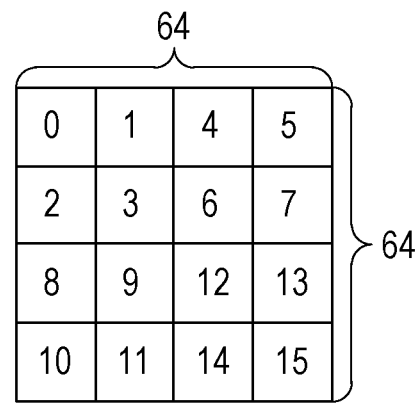
FIGS. 6A to 6C are explanatory diagrams illustrating size decision processing.
Figure 6B:
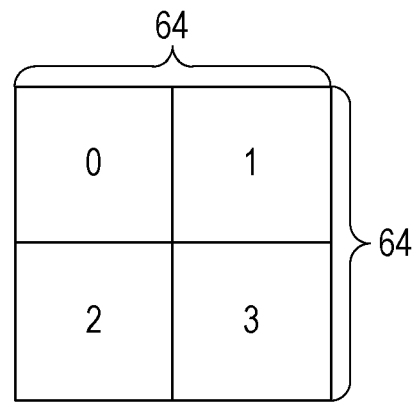
Figure 6C:
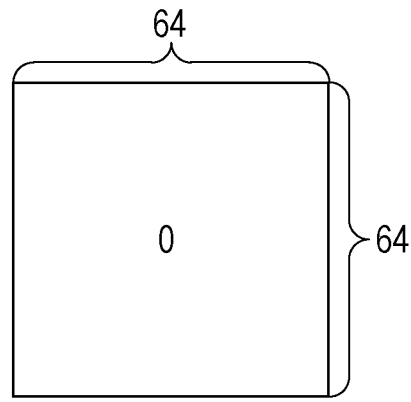

FIG. 5 is a flowchart illustrating size decision processing to be performed by the size decision unit 205. FIGS. 6A to 6C are explanatory diagrams illustrating the size decision processing. In S501, the size decision unit 205 initializes a variable to be used for the processing. More specifically, the size decision unit 205 sets 0 as the values of a flag 32×32[i] (i=0, 1, 2, 3) and a flag 64×64. Next, in S502, the size decision unit 205 performs division determination processing on a 16×16 block. Next, in S503, the size decision unit 205 performs the division determination processing on a 32×32 block. Next, in S504, the size decision unit 205 performs the division determination processing on a 64×64 block. Next, in S505, based on the results, the size decision unit 205 decides a prediction block size (PU size) and a coding block size (CU size) for inter-prediction. The processing in S502 to S504 will be described in detail below.

Figure 7:
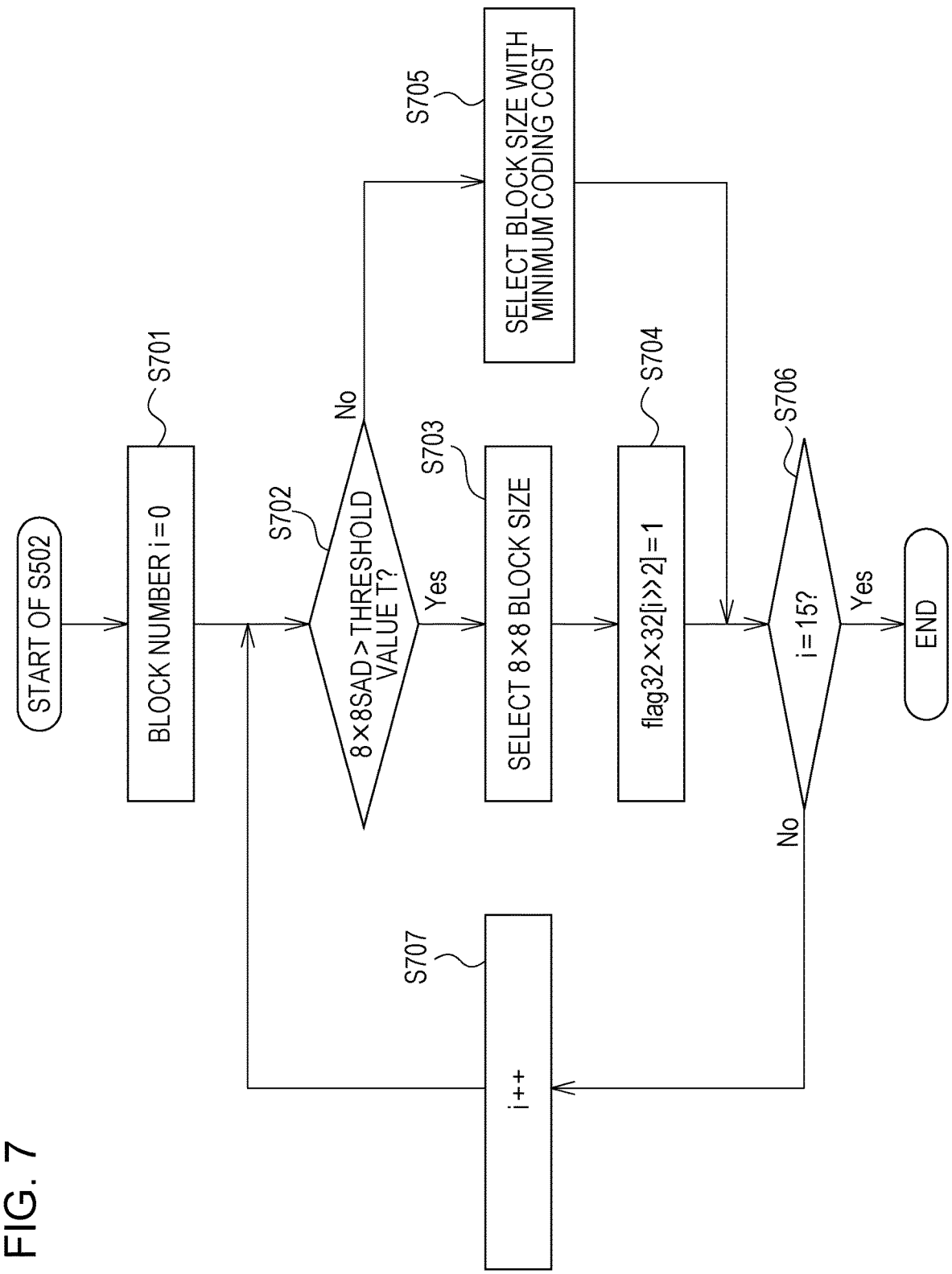
FIG. 7 is a flowchart illustrating processing in S502.

FIG. 7 is a flowchart illustrating detail processing in S502. In S701, the size decision unit 205 sets 0 to i and selects a 16×16 block 0 illustrated in FIG. 6A as a processing subject. The size decision unit 205 then acquire an 8×8 SAD with a minimum coding cost from the inter-coding cost calculation unit 204 for four 8×8 blocks included in the processing subject, 16×16 block 0. Next, in S702, the size decision unit 205 compares the 8×8 SADs acquired in S701 and a threshold value T. Here, the threshold value T may be predetermined in the moving image coding apparatus 100. If one or more 8×8 SADs are higher than the threshold value T (Yes in S702), the size decision unit 205 advances the processing to S703. If one or more 8×8 SADs are equal to or lower than the threshold value T (No in S702), the size decision unit 205 advances the processing to S705. Generally, as the SAD increases, the coding efficiency decreases.

In S703, the size decision unit 205 selects the 8×8 block size independently of the coding costs for blocks having the other block sizes (16×8, 8×16, 16×16). Next, in S704, the size decision unit 205 sets 1 to the flag 32×32[i>>2]. Here, i>>2 represents an operation for shifting a variable i by 2 bits to the right (or an operation for dividing the variable i by 4 and rounding down the remainder). After the processing in S704, the size decision unit 205 advances the processing to S706. The processing in S702 and S703 is an example of a decision process for deciding the 8×8 block size being a reference size as a block size for inter-prediction when a preset first condition that the 8×8 SAD is higher than the threshold value T is satisfied.

On the other hand, in S705, the size decision unit 205 acquires coding costs for division block sizes (8×8, 8×16, 16×8 blocks) of a 16×16 block and a coding cost for a 16×16 block that is not divided. This processing is an example of a coding cost determination process (or coding cost derivation process) for determining (deriving) a coding cost. The size decision unit 205 selects a block size with a minimum coding cost from the block sizes. After the processing in S705, the size decision unit 205 advances the processing to S706. In S706, the size decision unit 205 determines whether all of sixteen 16×16 blocks (16×16 block 0 to 16×16 block 15) illustrated in FIG. 6A have been completely processed or not. If there is unprocessed 16×16 blocks (No in S706), the size decision unit 205 advances the processing to S707. In S707, the size decision unit 205 increments the variable i and then advances the processing to S702. If all of the blocks have completely been processed (Yes in S706), the size decision unit 205 ends the processing in S502.

Figure 8:
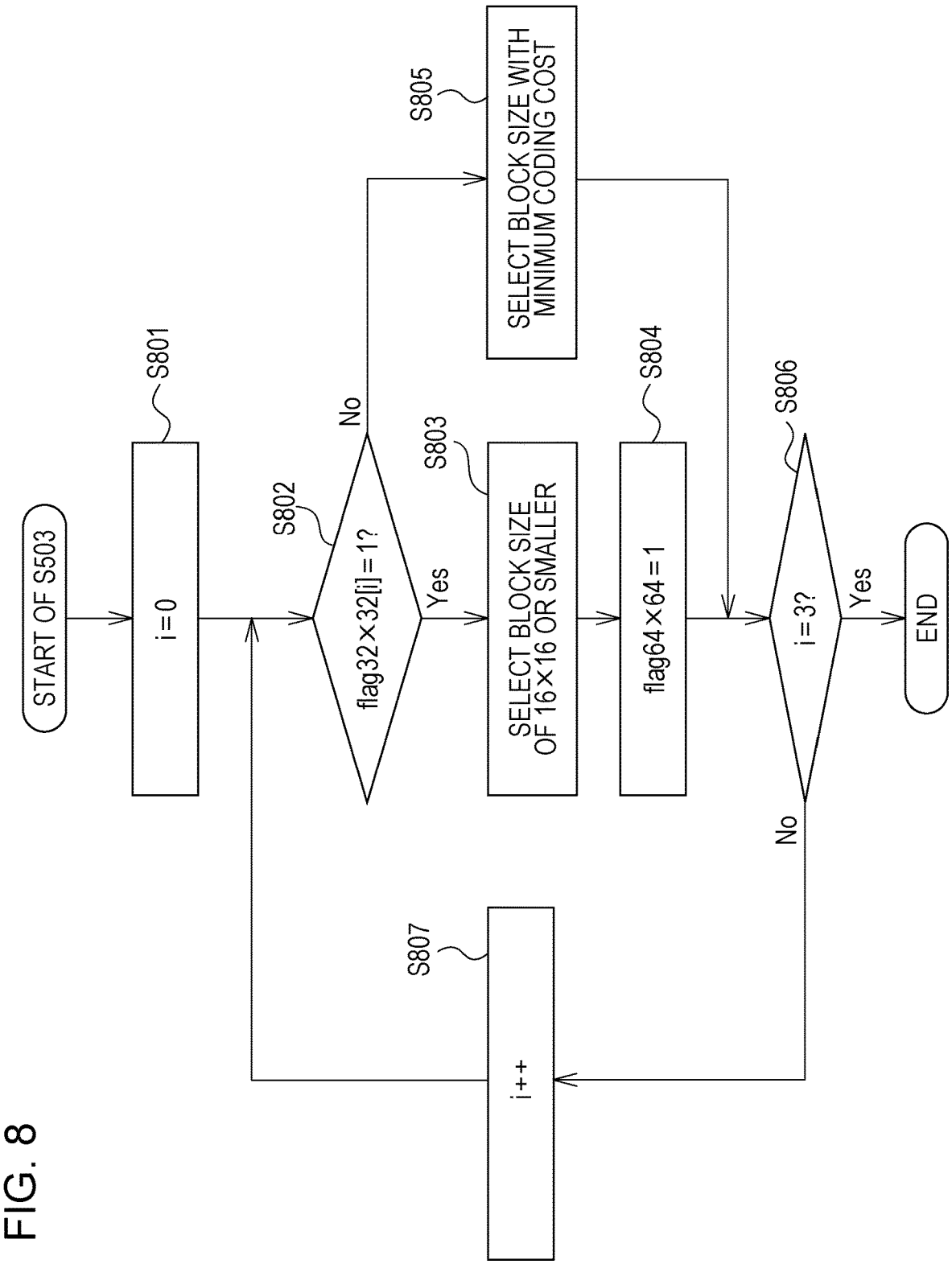
FIG. 8 is a flowchart illustrating processing in S503.

FIG. 8 is a flowchart illustrating detail processing in S503. In S801, the size decision unit 205 sets 0 to i and selects as a processing subject a 32×32 block 0 illustrated in FIG. 6B. Next, in S802, the size decision unit 205 checks the value of a flag 32×32[i] of a 32×32 block i being a processing subject. If the flag 32×32[i] is 1 (Yes in S802), the size decision unit 205 advances the processing to S803. If the flag 32×32[i] is 0 (Yes in S802), the size decision unit 205 advances the processing to S803. In S803, the size decision unit 205 selects the block size selected in the processing in S502 independently of the coding costs for blocks having the other block sizes (16×32, 32×16, and 32×32). In other words, the 8×8 block size is selected for a 16×16 block including an 8×8 SAD exceeding the threshold value T. Next, in S804, the size decision unit 205 sets 1 to a flag 64×64 and the advances the processing to S806.

On the other hand, in S805, the size decision unit 205 acquires the coding cost for the block size selected in the processing in S502, the coding cost for the 16×32 and 32×16 blocks, and a coding cost for a 32×32 block that is not divided. The size decision unit 205 selects a block size with a minimum coding cost from those block sizes. After the processing in S805, the size decision unit 205 advances the processing to S806. In S806, the size decision unit 205 determines whether all of four 32×32 blocks (32×32 block 0 to 32×32 block 3) illustrated in FIG. 6B have completely been processed or not. If there is an unprocessed 32×32 block (No in S806), the size decision unit 205 advances the processing to S807. In S807, the size decision unit 205 increments the variable i and then advances the processing to S802. If all of the blocks have completely been processed (Yes in S806), the size decision unit 205 ends the processing in S503.

Figure 9:
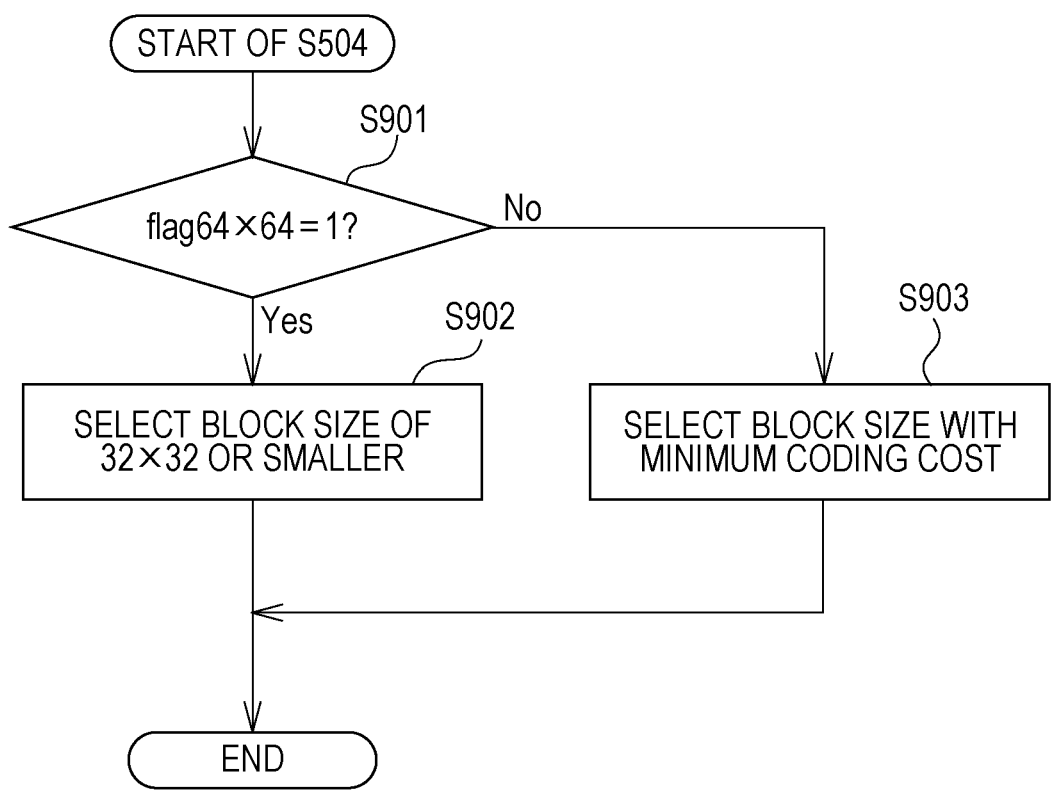
FIG. 9 is a flowchart illustrating processing in S504.

FIG. 9 is a flowchart illustrating detail processing in S504. In S901, the size decision unit 205 selects the 64×64 block illustrated in FIG. 6C as a processing subject. The size decision unit 205 then checks the value of the flag 64×64 of the 64×64 block. If the flag 64×64 is 1 (Yes in S901), the size decision unit 205 advances the processing to S902. If the flag 64×64 is 0 (No in S901), the size decision unit 205 advances the processing to S903. In S902, the size decision unit 205 selects the block size selected in the processing in S502 and S503 independently of the coding costs for the other block sizes (32×64, 64×32, and 64×64). In other words, the 8×8 block size is selected for the 16×16 block including an 8×8 SAD exceeding the threshold value T. The processing in S504 ends here. On the other hand, in S903, the size decision unit 205 acquires a coding cost for the block size selected in the processing in S502 and S503, coding costs for 32×64 and 64×32 blocks, and a coding cost for a 64×64 block that is not divided. From those block sizes, the size decision unit 205 selects a block size with a minimum coding cost as a block size for inter-prediction. The processing in S504 ends here. The processing in S705, S805, and S903 is an example of a decision process for deciding a block size for inter-prediction from a plurality of sizes based on coding costs for blocks having a plurality of different sizes equal to or smaller than the block unit (64×64 CTU).

Figure 10A:
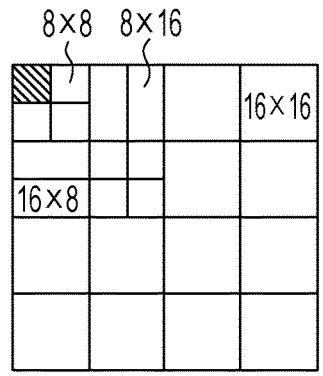
FIGS. 10A to 10D are explanatory diagrams illustrating division determination processing.
Figure 10B:
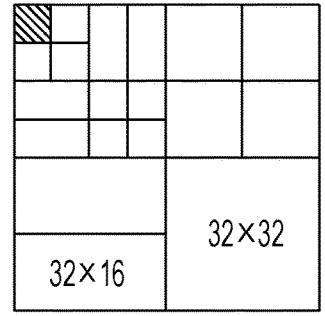
Figure 10C:
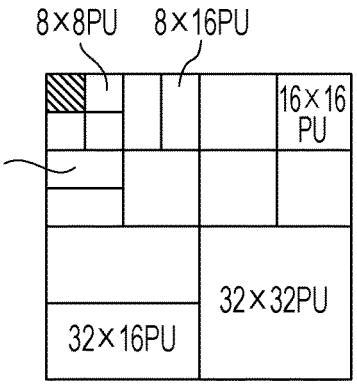

FIGS. 10A to 10D are explanatory diagrams illustrating division determination processing (in S502, S503, and S504). Referring to FIGS. 10A to 10C, the shaded 8×8 block is a block having an SAD exceeding a threshold value. As illustrated in FIG. 10A, it is assumed here that the upper left 16×16 block contains the 8×8 block having a SAD exceeding the threshold value. In this case, the processing in S502 selects 8×8 block division for the upper left 16×16 block. For the other 16×16 blocks, a block size with a minimum coding cost is selected.

Figure 10D:
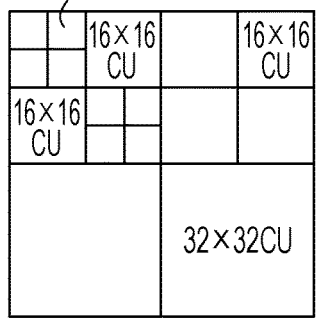

Because the upper left 32×32 block contains an 8×8 block having a SAD exceeding the threshold value, the processing in S503 selects a division result up to the 16×16 block for the block, as illustrated in FIG. 10B. For the other 32×32 blocks, a block size with a minimum coding cost is selected. The processing in S504 selects a division result up to the 32×32 block as illustrated in FIG. 10C as a PU size (prediction block size) within the 64×64 block. This is because the 64×64 block already contains the 8×8 block having an SAD exceeding the threshold value. FIG. 10D illustrates CU divisions corresponding to the PU divisions in FIG. 10C.

The size decision unit 205 outputs to the determination unit 110 a coding cost corresponding to the inter-prediction block size information decided by the processing above. The size decision unit 205 further outputs the inter-prediction block size information to the intra-coding cost calculation unit 206 in the intra-prediction unit 109.

Figure 11A:
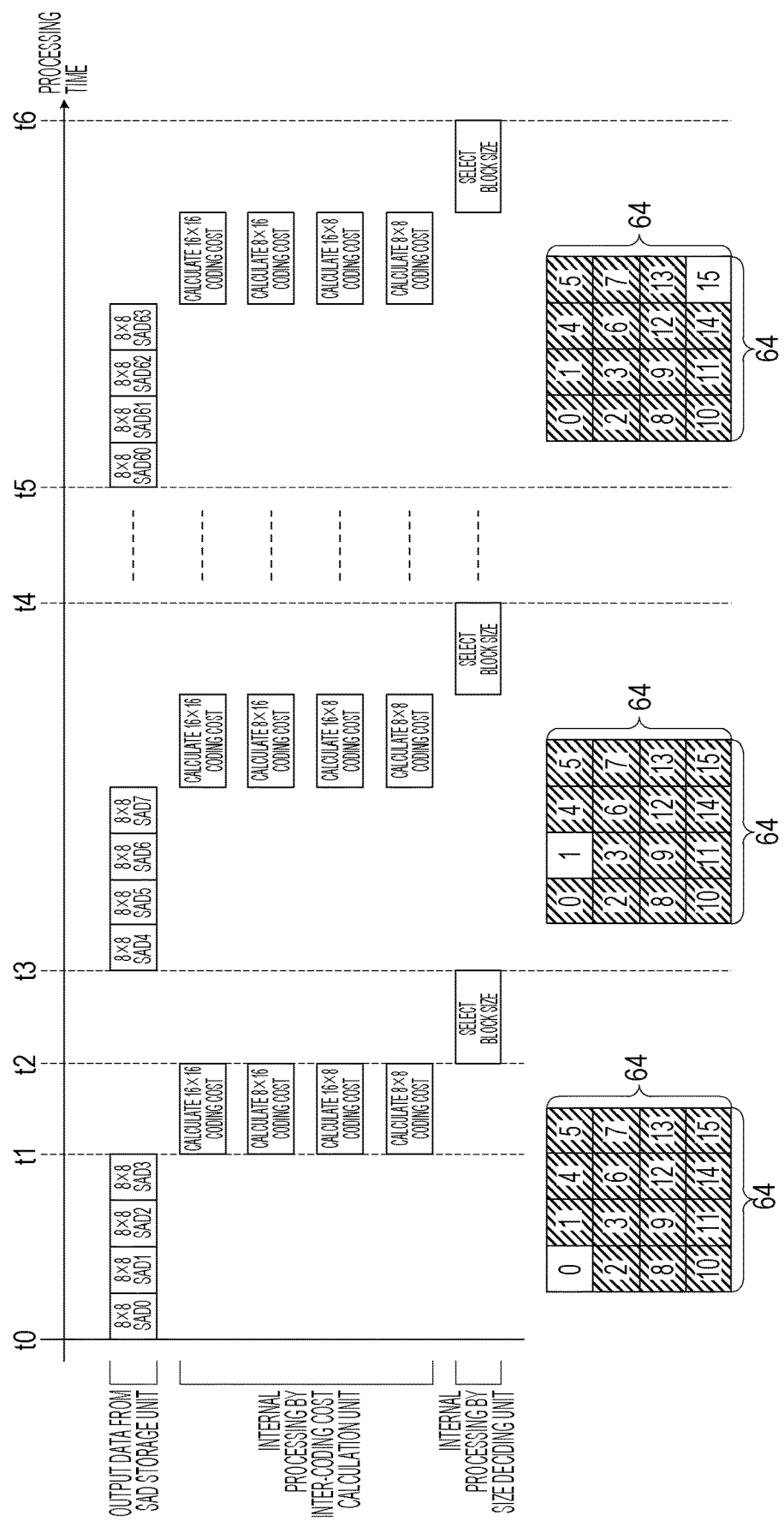
FIG. 11A is a timing chart illustrating division determination processing.

FIG. 11A to FIG. 11C illustrate timing charts for the division determination processing (in S502, S503, S504) performed on 16×16, 32×32, and 64×64 blocks in the inter-coding cost calculation unit 204 and the size decision unit 205. First, with reference to FIG. 11A, a timing chart for a division determination performed on a 16×16 block will be described. The inter-coding cost calculation unit 204 reads out (from t0 to t1) SAD information of four 8×8 blocks corresponding to the 16×16 block from the SAD storage unit 203. In the moving image coding apparatus 100 according to this embodiment, as described above, nine SADs are calculated for one 8×8 block, and the illustrated 8×8 SAD0 represents nine 8×8 SADs.

Next, the inter-coding cost calculation unit 204 calculates (from t1 to t2) a coding cost for (16×16) without division and motion vectors and SAD values producing minimum coding costs for (8×16, 16×8, 8×8) with division. The minimum coding costs for the block sizes are output to the size decision unit 205. The size decision unit 205 compares the SAD of the 8×8 blocks and a threshold value T. If the SAD is higher than the threshold value T, the size decision unit 205 selects 8×8 block division for the 16×16 block 0. If the SAD is equal to or lower than threshold value T, the size decision unit 205 selects (from t2 to t3) a block division producing a lowest coding cost among the four divisions (8×16, 16×8, 8×8, and 16×16). The processing from t0 to t1 corresponds to the processing in S702 to S705 illustrated in FIG. 7. The moving image coding apparatus 100 repeats this processing from a 16×16 block 1 (t3 to t4) to a 16×16 block 15 (t5 to t6).

Next, with reference to FIG. 11B, a timing chart for a division determination performed on a 32×32 block will be described. The inter-coding cost calculation unit 204 reads out (from t7 to t8) SAD information of sixteen 8×8 blocks corresponding to the 32×32 block 0 from the SAD storage unit 203. Next, the inter-coding cost calculation unit 204 calculates (from t8 to t9) a coding cost for (32×32) without division and motion vectors and SAD values producing minimum coding costs for (32×16, 16×32) with division.

If there is an 8×8 block with a SAD higher than a threshold value within the 32×32 block, the size decision unit 205 directly selects a division result (of a 16×16 block) until t6. If there is not an 8×8 block having a SAD higher than a threshold value, the size decision unit 205 selects a block division producing a minimum coding cost from four division blocks (division results until t6, 32×16, 16×32, 32×32) (t9 to t10). The processing from t7 to t10 corresponds to the processing in S802 to S805 in FIG. 8. The moving image coding apparatus 100 repeats the processing from a 32×32 block 1 to 32×32 block 3 (t10 to t12).

Next, with reference to FIG. 11C, a timing chart for division determination performed on a 64×64 block will be described. The inter-coding cost calculation unit 204 reads out (from t13 to t14) SAD information of 64 8×8 blocks from the SAD storage unit 203. Next, the inter-coding cost calculation unit 204 calculates (from t14 to t15) motion vectors and SAD values producing minimum coding costs for (64×64) without division and (64×32, 32×64) with division.

If there is an 8×8 block having a SAD higher than a threshold value within the 64×64 block, the size decision unit 205 directly selects a division result (of a 32×32 block) until t13. If there is not an 8×8 block having a SAD higher than a threshold value, the size decision unit 205 selects a block division producing a minimum coding cost from four division blocks (division results until t13, 64×32, 32×64, 64×64) (t15 to t16). The processing from t13 to t16 corresponds to the processing in FIG. 9.

Referring back to FIG. 2, the intra-prediction unit 109 will be described. Inter-block size information output from the inter-prediction unit 108 is input to the intra-coding cost calculation unit 206 within the intra-prediction unit 109. The intra-coding cost calculation unit 206 may decide a block size for the intra-prediction based on the inter-block size information. For example, if an inter-block size as illustrated in FIG. 10D is decided, the same size is decided as a block size for intra-prediction (intra-block size). In other words, the intra-coding cost calculation unit 206 decides an inter-block size as an intra-block size. The intra-coding cost calculation unit 206 may search a prediction mode for the decided intra-block size and select a prediction mode producing a minimum coding cost.

According to another example, the intra-coding cost calculation unit 206 may decide a size equal to or smaller than the inter-block size as an intra-block size. The intra-prediction may apply a 4×4 PU. Accordingly, if inter-prediction selects an 8×8 CU, the intra-coding cost calculation unit 206 searches a prediction mod for a 4×4 PU that is a size equal to or smaller than an 8×8 CU. Then, the intra-coding cost calculation unit 206 may decide a size producing a minimum coding cost as an intra-block size among sizes equal to or smaller than the inter-block size. Because the intra-coding cost calculation unit 206 decides a block size for intra-prediction based on the inter-block size information, the calculation amount for the decision of an intra-prediction block size can be reduced.

The moving image coding apparatus 100 according to the first embodiment as described above decides a block size for intra-prediction based on the block size decided by the inter-prediction unit 108. Thus, the calculation amount for the intra-block size decision can be reduced. If an 8×8 SAD for inter-prediction is higher than the threshold value T, the moving image coding apparatus 100 selects an 8×8 block as an inter-prediction block independently of its coding cost. Thus, the moving image coding apparatus 100 can select an 8×8 block for intra-prediction.

Thus, in deciding a block size for intra-prediction based on the block size for inter-prediction, increases of the calculation amount can be reduced while improving the coding efficiency in moving image coding. In particular, coding using a larger block size is efficient from an inter-prediction viewpoint. However, the coding efficiency may be improved in an image on which coding applying intra-prediction with a smaller block size is more efficient.

According to a first variation example of the first embodiment, the parameter being a determination criterion for determining whether an 8×8 block is to be selected as a block size for inter-prediction or not is not limited to a SAD. The moving image coding apparatus 100 may compare an arbitrary feature amount (such as an activity of an input image) of an 8×8 block and a threshold value. The arbitrary feature amount may be, for example, an index value relating to a distribution of pixels within an input image (within a frame to be processed) such as an activity. Thus, the feature amount may be a feature amount having an influence on coding efficiency with inter-prediction.

According to a second variation example, a block size to be selected in a case where an 8×8 SAD is higher than a threshold value may be a size smaller than a preset CTU and is not limited to an 8×8 block size. According to another example, the moving image coding apparatus 100 may select an 8×8 block size in a case where an 8×8 SAD is equal to or lower than a threshold value or may select another block size. The moving image coding apparatus 100 may apply a SAD having a size excluding 8×8 as a determination criterion and may compare a SAD having the size excluding 8×8 and a threshold value. The size being a determination criterion may be a size smaller than a CTU and is not limited to this embodiment. It may be controlled to select an 8×8 block size if it is lower than a threshold value or to select another block size.

Second Embodiment

Next, a moving image coding apparatus 100 according to a second embodiment will be described with respect to differences from the moving image coding apparatus 100 according to the first embodiment. The moving image coding apparatus 100 according to the second embodiment adaptively executes a comparison process between an 8×8 SAD and a threshold value based on a control signal and adaptively selects a threshold value for an 8×8 SAD based on a coding parameter.

FIG. 12 is a functional configuration diagram illustrating the prediction processing unit 112 in the moving image coding apparatus 100 according to the second embodiment. According to the second embodiment, the overall control unit 101 sets a control flag (frame unit control information) of a comparison process in frames based on a result of coding performed on an immediately preceding frame. According to the second embodiment, an inter-prediction control unit 1201 sets a CTU unit control flag (CTU unit control information) based on a value of a frame unit control flag. The inter-prediction control unit 1201 according to this embodiment sets 1 to the CTU unit control flag if the control flag has 1 and otherwise sets 0.

Figure 13:
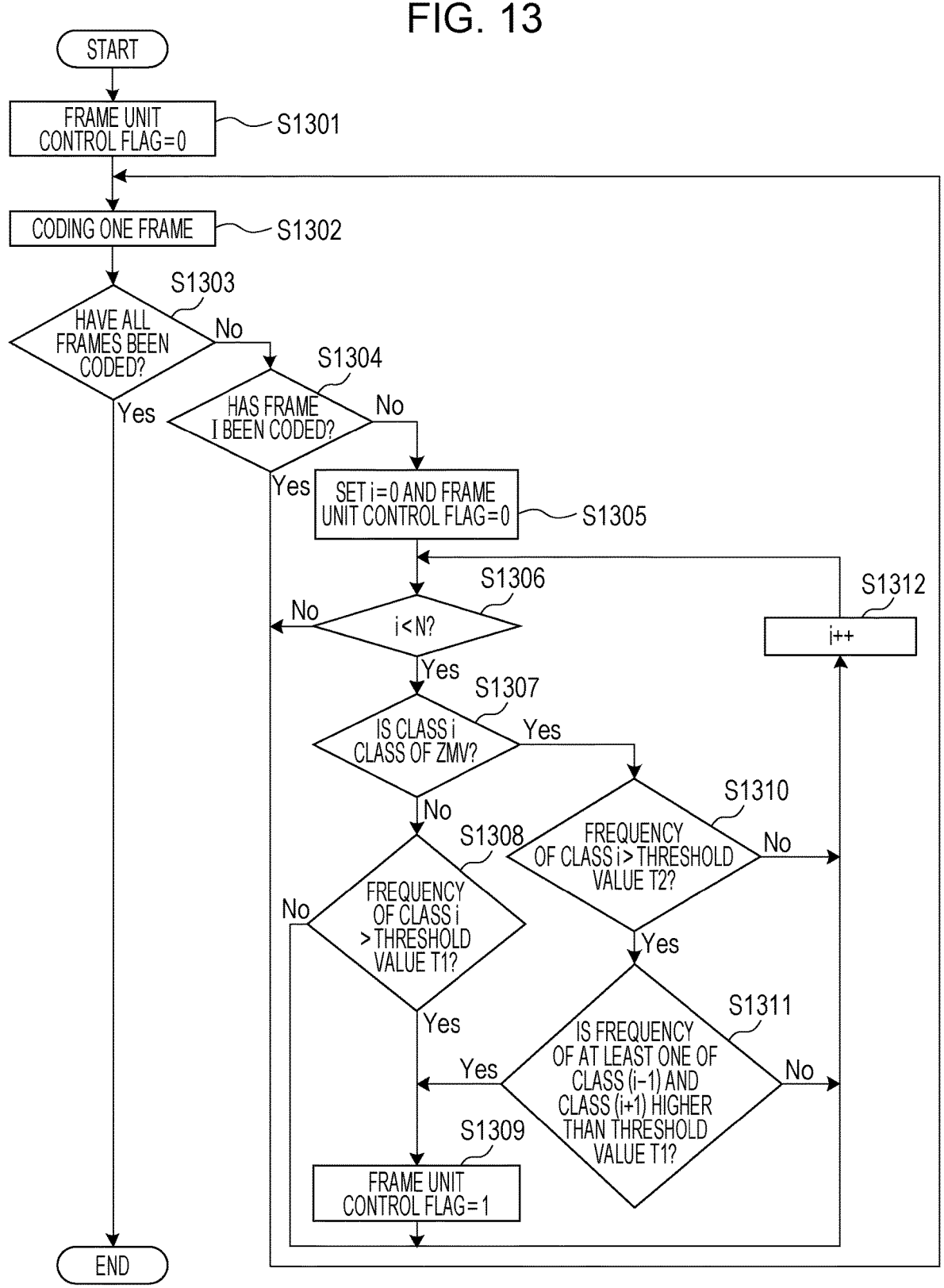
FIG. 13 is a flowchart illustrating control flag setting processing.

FIG. 13 is a flowchart illustrating control flag setting processing to be performed by the overall control unit 101. Here, the frame unit control flag is referred in the division determination processing (S502) to be performed on the 16×16 block described with reference to FIG. 5. In S1301, the overall control unit 101 initializes the frame unit control flag with 0. Next, in S1302, the overall control unit 101 controls to code one frame. The overall control unit 101 generates a motion vector histogram (hereinafter called an MV histogram) for one frame in a case where a P frame is to be coded. The histogram will be described below. Next, in S1303, the overall control unit 101 checks whether all frames included in a processing subject moving image have been coded or not. If all of the frames have been coded (Yes in S1303), the overall control unit 101 ends the control flag setting processing. If there is an unprocessed frame (No in S1303), the overall control unit 101 advances the processing to S1304.

In S1304, the overall control unit 101 determines whether the frame coded last time is an I frame or not. If it is an I frame (Yes in S1304), the overall control unit 101 holds the value of the frame unit control flag at the time of the processing without updating the frame unit control flag and advances the processing to S1302. In this case, in S1302, the overall control unit 101 controls to code the next frame. If the coded frame is not an I frame (No in S1304), the overall control unit 101 advances the process to S1305. In S1305, the overall control unit 101 sets 0 to the frame unit control flag. The overall control unit 101 further sets 0 to a loop control variable i. Then, the overall control unit 101 starts determination on a motion vector histogram acquired when the immediately preceding P/B frame is coded.

Figure 14:
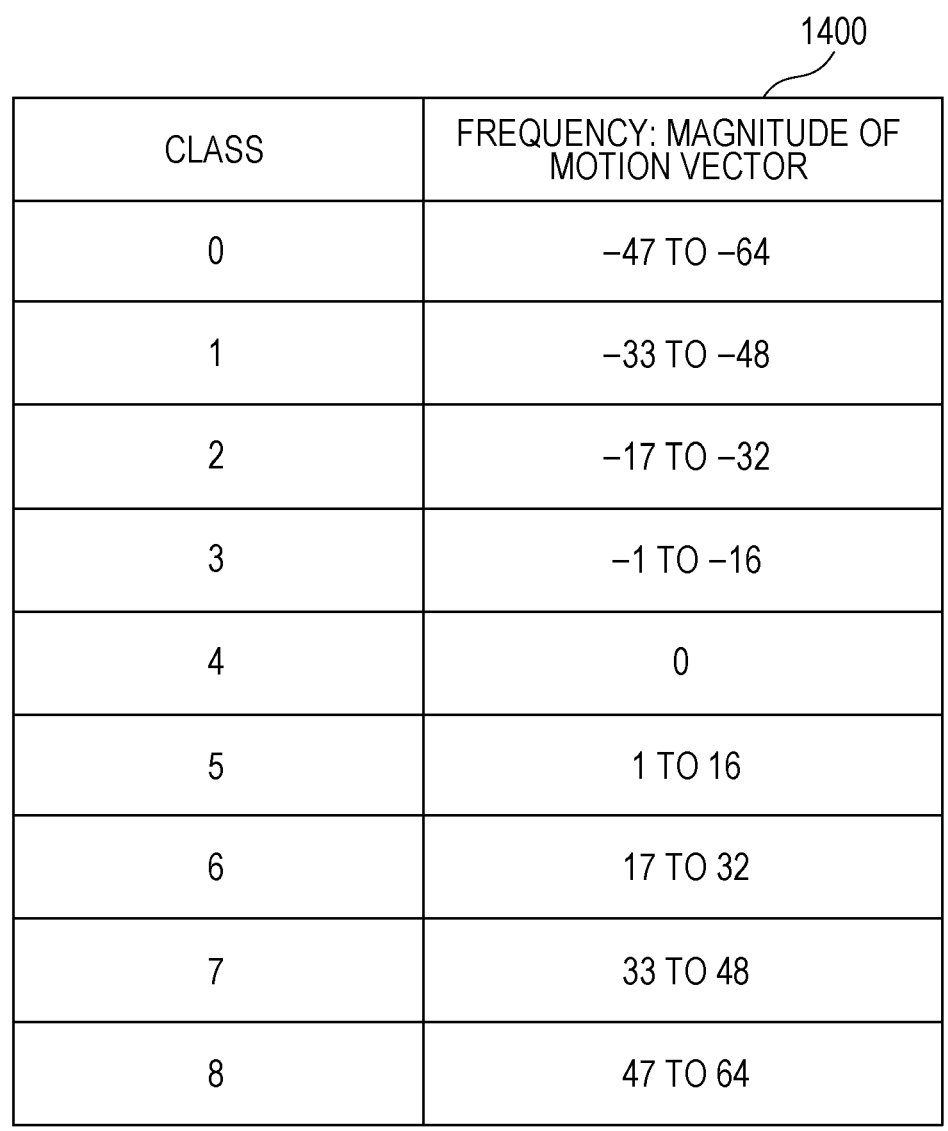
FIG. 14 illustrates an MV histogram example.

The overall control unit 101 generates histogram information on a motion vector as coding information from a P/B frame coded immediately before the processing of the size decision processing on a subject frame within one moving image. FIG. 14 illustrates an example of an MV histogram 1400. Class 4 in the MV histogram corresponds to a zero motion vector (hereinafter, called a ZMV), and its frequency corresponds to the number of times of occurrence of the ZVM (the number of XMV in a subject frame. The other classes have frequencies corresponding to the number of times of occurrence of a non-zero motion vector (MV). Here, a histogram is provided for each of x and y directions (vertical and horizontal directions) of a motion vector.

Referring back to FIG. 13, after the processing in S1305, the overall control unit 101 advances the processing to S1306. In S1306, the overall control unit 101 compares Class i and the number N of classes in the histogram. If Class i is smaller than the number N of classes (Yes in S1306), the overall control unit 101 advances the processing to S1307. If Class i is equal to or higher than the number N of classes (No in S1306), the overall control unit 101 ends the processing on the frame and advances the processing to S1302. In S1307, the overall control unit 101 checks whether Class i is a class of the ZMV or not. If it is a class of the ZMV (Yes in S1307), the overall control unit 101 advances the processing to S1310. If it is a class of an MV excluding the ZMV (No in S1307), the overall control unit 101 advances the processing to S1308.

In S1308, the overall control unit 101 compares the frequency of Class i and a preset threshold value T1. If the Class i has a frequency higher than the threshold value T1 (Yes in S1308), the overall control unit 101 advances the processing to S1309. If the Class i has a frequency equal to lower than the threshold value T1 (No in S1308), the overall control unit 101 advances the processing to S1312. In S1312, the overall control unit 101 increments i and advances the processing to S1306 to process the next class. In S1309, the overall control unit 101 sets 1 in the frame unit control flag and then advances the processing to S1312.

In S1310, the overall control unit 101 compares the frequency of Class i and a preset threshold value T2. If Class i have a frequency higher than the threshold value T2 (Yes in S1310), the overall control unit 101 advances the processing to S1311. If Class i has a frequency equal to or lower than the threshold value T2 (No in S1310), the overall control unit 101 advances the processing to S1312. In S1311, the overall control unit 101 compares the frequencies of Class (i−1) and Class (i+1) and the threshold value T1. If at least one class of Class (i−1) and Class (i+1) has a frequency higher than the threshold value T1 (Yes in S1311), the overall control unit 101 advances the processing to S1309. If both of the classes have frequencies equal to or lower than the threshold value T1 (No in S1311), the overall control unit 101 advances the processing to S1312.

Figure 15:
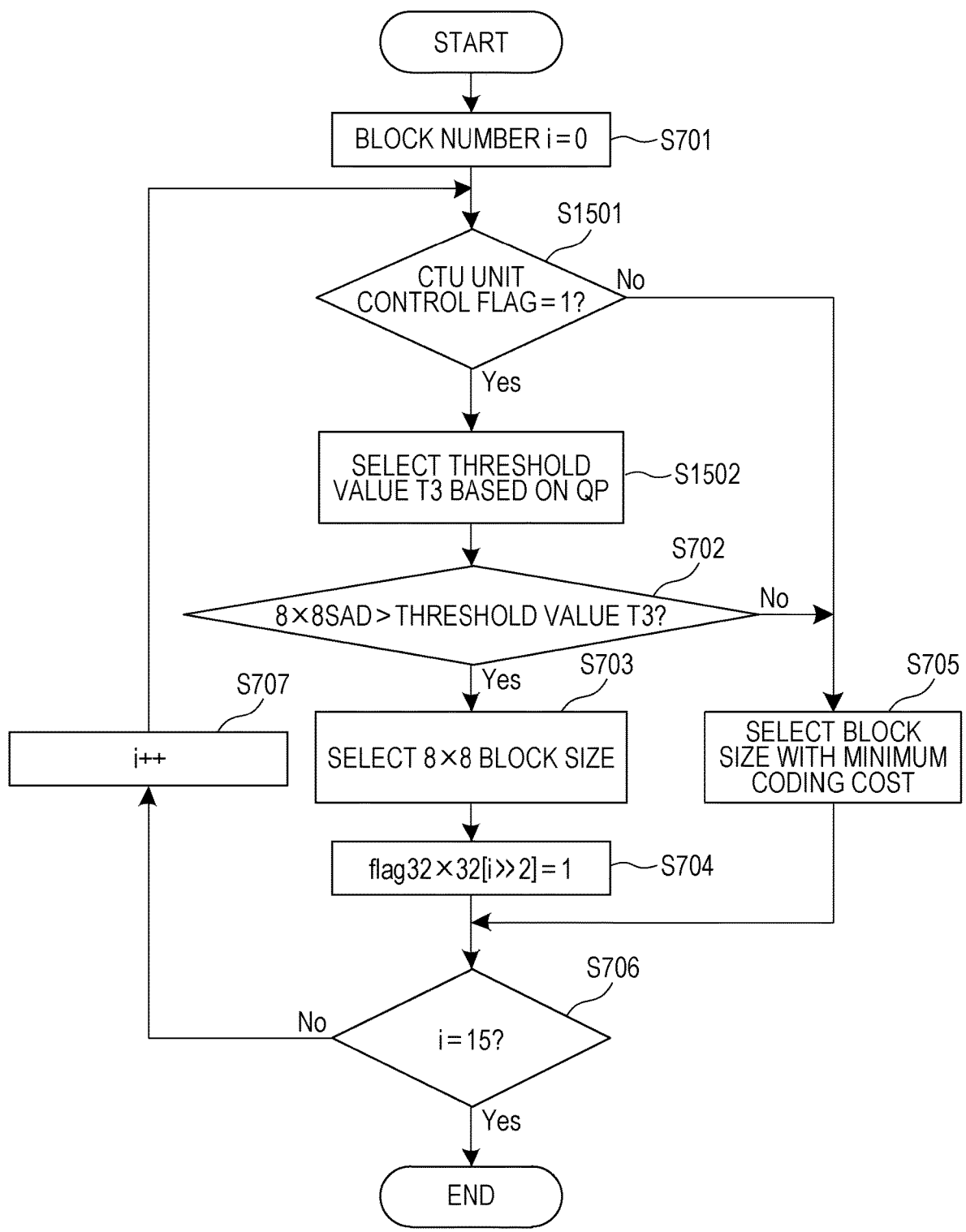
FIG. 15 is a flowchart illustrating processing in S502.

FIG. 15 is a flowchart illustrating detail processing in S502 in FIG. 5. Like numbers to refer to like processes among the processes according to the first embodiment described with reference to FIG. 5 and the processes illustrated in FIG. 15. After the processing in S701, the size decision unit 1202 advances to processing to S1501. In S1501, the size decision unit 1202 checks the CTU unit control flag. If the CTU unit control flag has 1 (Yes in S1501), the size decision unit 1202 advances the processing to S1502. If the CTU unit control flag has 0 (No in S1501), the size decision unit 1202 advances the processing to S705. In S1502, the size decision unit 1202 sets a threshold value T3 based on a quantization parameter QP. The size decision unit 1202 then advances the processing to S702. Judgment conditions in S1307, S1308, S1310, and S1311 are examples of a second condition relating to the motion vector of an already coded frame. The motion vector of a coded frame is an example of coding information.

In the following description, a process (S1502 to S704) called a first process decides a reference size as a block size for inter-prediction in a case where the SAD of the reference size described with reference to FIG. 15 is higher than a threshold value. A process (S705) called a second process decides a block size producing a minimum coding cost as a block size for inter-prediction. The processing illustrated in FIG. 15 is an example of processing (decision processing) for controlling to perform the first process in a case where coding information of an already coded frame in the same moving image as that of the processing subject frame is matched with a condition regarding a preset motion vector. The processing in FIG. 15 is an example of processing (decision processing) for controlling to execute the second process in a case where the coding information of the coded frame is not matched with the condition relating to the motion vector. The other configurations and processes to be performed in the moving image coding apparatus 100 according to the second embodiment are the same as the configurations and processes to be performed in the moving image coding apparatus 100 according to the first embodiment.

As described above, the moving image coding apparatus 100 according to the second embodiment can adaptively control in frames a block size selecting method based on a comparison result between an 8×8 SAD and a threshold value. Thus, the coding efficiency can further be improved.

According to a first variation example of the second embodiment, while the moving image coding apparatus 100 compares the frequency of a non-zero motion vector and the frequency of a zero motion vector with a threshold value, the coding information is not limited to a frequency of a motion vector. Arbitrary coding information (such as a quantization parameter, a ratio between an intra-CU and an inter-CU, and a feature amount of an input image) can be utilized.

A second variation example is not limited to the processing of the second embodiment which sets 1 to the control flag if a histogram has a value higher than a threshold value. The moving image coding apparatus 100 may performed the processing if the histogram value is lower than a threshold value.

A third variation example is not limited to the processing for generating histograms in both x and y directions in the threshold value determination in S1306 to S1311 by the overall control unit 101 according to the second embodiment. According to another example, the overall control unit 101 may execute a threshold value determination for a histogram in an x direction and then execute a threshold value determination for a histogram in a y direction. After setting 1 to the control flag, the overall control unit 101 may skip the determination process for the remaining classes.

According to a fourth variation example, the processing subject in S1311 may be a class defined with reference to Class i though Class (i+1) and Class (i−1) are processing subjects according to the second embodiment. Embodiments of the present disclosure are not limited thereto. According to another example, Class (i+k) and Class (i−k) (where k is an integer equal to or higher than 1) may be processing subjects in S1311.

A fifth variation example will be described. The frame already coded upon execution of the control flag setting processing, which is referred in the control flag setting processing, may be a P/B frame included in a moving image also including a subject frame of the control flag setting processing and is not limited to the immediately preceding P/B frame.

A sixth variation example will be described. The control for determining whether the first process is to be performed or not is may be executed in frames. According to another example, it may be assumed that there is an already coded block in a subject frame with the frame unit control flag set in the control flag setting processing before the start of the processing in FIG. 15. In this case, the size decision unit 1202 generates a histogram of a motion vector as described according to the second embodiment for an already coded block in the subject frame. The size decision unit 1202 may set a CTU unit control flag for the processing subject block by performing threshold-based processing relating to the frequency in the histogram, which corresponds to the processing in S1307 to S1311 in FIG. 13. Thus, whether the first process is to be performed in CTUs or not can adaptively be controlled.

According to this embodiment, the moving image coding apparatus 100 is applied to HEVC, for example. However, the subject of the moving image coding apparatus 100 is not limited to HEVC.

Figure 16:
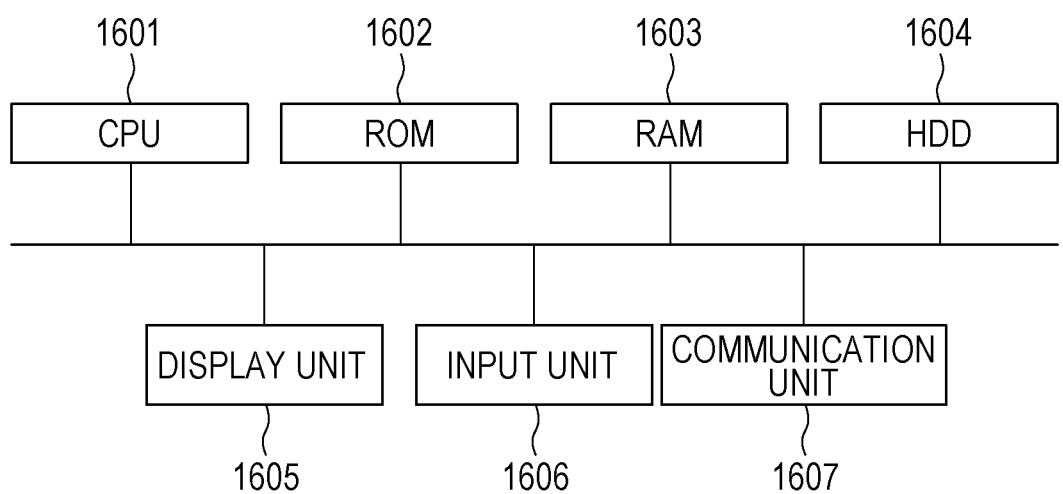
FIG. 16 illustrates a hardware configuration of a moving image coding apparatus.

FIG. 16 is a hardware configuration diagram illustrating the moving image coding apparatus 100 according to this embodiment. The moving image coding apparatus 100 has a CPU 1601, a ROM 1602, a RAM 1603, an HDD 1604, a display unit 1605, an input unit 1606, and a communication unit 1607. The CPU 1601 reads out a control program stored in the ROM 1602 and executes processes including the aforementioned processes. The RAM 1603 may be used as a main memory and a temporary storage area such as a work area for the CPU 1601. The HDD 1604 is configured to store data and programs. The display unit 1605 is configured to display information. The input unit 1606 has a keyboard and a mouse and is configured to receive an operation performed by a user. The communication unit 1607 is configured to perform a communication process with an external apparatus over a network.

It should be understood that functions and processes of the moving image coding apparatus 100, which will be described below, are implemented by a program stored in the ROM 1602 or the HDD 1604 read and executed by the CPU 1601. According to another example, the CPU 1601 may read out a program stored in a recording medium such as an SD card instead of the ROM 1602, for example.

According to another example, at least some of functions and processes of the moving image coding apparatus 100 may be implemented in collaboration with a plurality of CPUs, RAMS, ROMs, and storages, for example. According to another example, at least some of functions and processes of the moving image coding apparatus 100 may be implemented by a hardware circuit.

Having described embodiments of the present disclosure in detail up to this point, the present disclosure is not limited to the specific embodiments but may be altered, modified and changed variously without departing from the spirit and scope of the claimed invention.

Other Embodiments

The present disclosure may be implemented by executing a program implementing one or more functions of the aforementioned embodiments supplied to a system or an apparatus through a network or a storage medium and read by one or more processors in a computer of the system or apparatus. The present invention may also be implemented by a circuit (such as an ASIC) which implements one or more functions.

According to the aforementioned embodiments, increases of the calculation amount can be reduced while increasing the coding efficiency in moving image coding.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094784 filed May 11, 2017, which is hereby incorporated by reference herein in its entirety.

What is claimed is:

1. A moving image coding apparatus dividing frames included in a moving image into predetermined block units and selectively performing inter-prediction or intra-prediction, the apparatus comprising a computer executing instructions that, when executed by the computer, cause the computer to function as:
   a feature amount derivation unit configured to derive a feature amount of at least a block having a reference size smaller than the block unit;
   a decision unit configured to decide a block size for inter-prediction and decide a block size for intra-prediction;
   a selection unit configured to select one of inter-prediction and intra-prediction as a prediction method for the block; and
   a coding cost derivation unit configured to derive a coding cost for coding each of a plurality of blocks having a plurality of sizes using inter-prediction,
   wherein the decision unit is configured to decide the reference size as the block size for inter-prediction and decide a size equal to or smaller than the block size for inter-prediction as the block size for intra-prediction, in a case where the feature amount of the block having the reference size is matched with a first condition; and
   wherein the decision unit is configured to decide the block size for inter-prediction from the plurality of sizes based on the coding costs derived by the coding cost derivation unit and decide a size equal to or smaller than the block size for inter-prediction as the block size for intra-prediction, in a case where the feature amount of the block having the reference size is not matched with the first condition.

2. The moving image coding apparatus according to claim 1, wherein the decision unit is configured to, in a case where the feature amount of the block having the reference size is matched with the first condition, decide a size equal to the block size for inter-prediction as a block size for intra-prediction.

3. The moving image coding apparatus according to claim 1,
wherein the feature amount is an index value indicating a difference between the subject frame and a reference frame; and
wherein the first condition is that the index value relating to the inter-prediction at the block having the reference size is higher than a threshold value.

4. The moving image coding apparatus according to claim 3,
wherein the feature amount is a SAD (Sum of Absolute Difference) between the subject frame and the reference frame; and
the first condition is that the SAD relating to the inter-prediction at the block having the reference size is higher than a threshold value.

5. The moving image coding apparatus according to claim 1,
wherein the feature amount is an index value indicating a distribution of pixels of the subject frame; and
wherein the first condition is that the index value of the block having the reference size is higher than a threshold value.

6. The moving image coding apparatus according to claim 5,
wherein the feature amount is an activity of a subject frame; and
wherein the first condition is that the activity of the block having the reference size is higher than a threshold value.

7. The moving image coding apparatus according to claim 1, wherein the feature amount derivation unit derives a feature amount of a block being a derivation subject based on the feature amount of the block having the reference size included in the block being the feature amount derivation subject.

8. A moving image coding apparatus dividing frames included in a moving image into predetermined block units and selectively performing inter-prediction or intra-prediction, the apparatus comprising a computer executing instructions that, when executed by the computer, cause the computer to function as:
a feature amount derivation unit configured to derive a feature amount of a block having a reference size smaller than a block unit, the block included in a subject frame being a processing subject of the frames included in the moving image;
a decision unit configured to, in a case where the feature amount, derived by the feature amount derivation unit, of the block having the reference size is matched with a first condition, decide the reference size as a block size for inter-prediction and decide a size equal to or smaller than the block size for inter-prediction as a block size for intra-prediction; and
a selection unit configured to perform a predetermined evaluation and select one of inter-prediction and intra-prediction as a prediction method for the block having the block size decided by the decision unit, wherein, in a case where an already coded frame in the moving image also including the subject frame has coding information matched with a second condition, the decision unit performs on the block having the block unit of the subject frame a first process deciding the reference size as a block size for inter-prediction in a case where the first condition is satisfied.

9. The moving image coding apparatus according to claim 8,
wherein the feature amount derivation unit derives feature amounts of blocks having a plurality of sizes equal to or smaller than the block unit,
the apparatus further comprising a coding cost derivation unit configured to derive coding costs of inter-prediction for the blocks having the plurality of sizes based on the feature amounts,
wherein, in a case where the coding information of the coded frame is not matched with the second condition, the decision unit performs on the block having the block unit of the subject frame a second process deciding a block size for inter-prediction from the plurality of sizes based on the coding costs of blocks having the plurality of sizes without performing the first process.

10. The moving image coding apparatus according to claim 8,
wherein the second condition is a condition relating to a motion vector of the coded frame.

11. The moving image coding apparatus according to claim 1,
wherein, in a case where an already coded block having the block unit in the subject frame has coding information matched with a third condition, the decision unit performs on the uncoded block having the block unit of the subject frame a first process deciding the reference size as a block size for inter-prediction in a case where the first condition is satisfied.

12. The moving image coding apparatus according to claim 11,
wherein the feature amount derivation unit derives feature amounts of blocks having a plurality of sizes equal to or smaller than the block unit,
the apparatus further comprising a coding cost derivation unit configured to derive coding costs for inter-prediction of the blocks having the plurality of sizes based on the feature amounts,
wherein, in a case where the coding information of the coded block having the block unit is not matched with the third condition, the decision unit performs on the uncoded block having the block unit of the subject frame a second process deciding a block size for inter-prediction from the plurality of sizes based on the coding costs of blocks having the plurality of sizes without performing the first process.

13. The moving image coding apparatus according to claim 11, wherein the third condition is a condition relating to a motion vector of the coded block having the block unit.

14. The moving image coding apparatus according to claim 1, wherein the reference size is a size of 8×8.

15. A moving image coding method to be executed by a moving image coding apparatus dividing frames included in a moving image into predetermined block units and selectively performing inter-prediction or intra-prediction, the method comprising:
deriving a feature amount of a block having a reference size smaller than the block unit;
deciding a block size for inter-prediction and decide a block size for intra-prediction;
selecting one of inter-prediction and intra-prediction as a prediction method for the block; and
deriving a coding cost for coding each of a plurality of blocks having a plurality of sizes using inter-prediction, wherein the reference size as the block size for inter-prediction is decided and a size equal to or smaller than the block size for inter-prediction as the block size for intra-prediction is decided, in a case where the feature amount of the block having the reference size is matched with a first condition; and wherein the block size for inter-prediction from the plurality of sizes based on the coding costs derived is decided and a size equal to or smaller than the block size for inter-prediction as the block size for intra-prediction is decided, in a case where the feature amount of the block having the reference size is not matched with the first condition.

16. A non-transitory recording medium readable by a computer in a moving image coding apparatus, the apparatus dividing frames included in a moving image into predetermined block units and selectively performing inter-prediction or intra-prediction, the recording medium storing a program causing the computer to function as:

a feature amount derivation unit configured to derive a feature amount of at least a block having a reference size smaller than the block unit;

a decision unit configured to decide a block size for inter-prediction and decide a block size for intra-prediction;

a selection unit configured to select one of inter-prediction and intra-prediction as a prediction method for the block; and a coding cost derivation unit configured to derive a coding cost for coding each of a plurality of blocks having a plurality of sizes using inter-prediction, wherein the decision unit is configured to decide the reference size as the block size for inter-prediction and decide a size equal to or smaller than the block size for inter-prediction as the block size for intra-prediction, in a case where the feature amount of the block having the reference size is matched with a first condition; and wherein the decision unit is configured to decide the block size for inter-prediction from the plurality of sizes based on the coding costs derived by the coding cost derivation unit and decide a size equal to or smaller than the block size for inter-prediction as the block size for intra-prediction, in a case where the feature amount of the block having the reference size is not matched with the first condition.

17. A moving image coding method to be executed by a moving image coding apparatus dividing frames included in a moving image into predetermined block units and selectively performing inter-prediction or intra-prediction, the method comprising:

deriving a feature amount of a block having a reference size smaller than a block unit, the block included in a subject frame being a processing subject of the frames included in the moving image;

deciding, in a case where the feature amount of the block having the reference size is matched with a first condition, deciding the reference size as a block size for inter-prediction and decide a size equal to or smaller than the block size for inter-prediction as a block size for intra-prediction; and performing a predetermined evaluation and selecting one of inter-prediction and intra-prediction as a prediction method for the block having the block size, wherein, in a case where an already coded frame in the moving image also including the subject frame has coding information matched with a second condition, performing on the block having the block unit of the subject frame a first process deciding the reference size as a block size for inter-prediction in a case where the first condition is satisfied.

18. A non-transitory recording medium readable by a computer to execute a moving image coding method in a moving image coding apparatus dividing frames included in a moving image into predetermined block units and selectively performing inter-prediction or intra-prediction, the method comprising:

deriving a feature amount of a block having a reference size smaller than a block unit, the block included in a subject frame being a processing subject of the frames included in the moving image;

deciding, in a case where the feature amount of the block having the reference size is matched with a first condition, deciding the reference size as a block size for inter-prediction and decide a size equal to or smaller than the block size for inter-prediction as a block size for intra-prediction; and performing a predetermined evaluation and selecting one of inter-prediction and intra-prediction as a prediction method for the block having the block size, wherein, in a case where an already coded frame in the moving image also including the subject frame has coding information matched with a second condition, performing on the block having the block unit of the subject frame a first process deciding the reference size as a block size for inter-prediction in a case where the first condition is satisfied.

* * * * *